United States Patent [19]

Iwatsuki et al.

[11] Patent Number: 4,858,496
[45] Date of Patent: Aug. 22, 1989

[54] DEVICE FOR INTEGRALLY CONTROLLING A SUPERCHARGED ENGINE AND AUTOMATIC TRANSMISSION IN VEHICLE

[75] Inventors: Kunihiro Iwatsuki; Yoshio Shindo, both of Toyota, Japan

[73] Assignee: Toyota Jidosha Kabushiki Kaisha, Aichi, Japan

[21] Appl. No.: 934,791

[22] Filed: Nov. 25, 1986

[30] Foreign Application Priority Data

Nov. 26, 1985 [JP] Japan .................................. 60-265929

[51] Int. Cl.⁴ ............................................. B60K 41/00
[52] U.S. Cl. ........................................ 74/863; 74/844
[58] Field of Search .................. 60/605, 602; 123/559;
74/863, 865, 866, 867, 877, 844

[56] References Cited

U.S. PATENT DOCUMENTS

| | | |
|---|---|---|
| 3,346,626 | 8/1982 | Kawamoto . |
| 3,640,156 | 2/1972 | Mori et al. . |
| 3,763,720 | 10/1973 | Aono et al. . |
| 3,895,541 | 7/1975 | Nohira et al. . |
| 4,056,991 | 11/1977 | Sakai et al. ........................... 74/863 |
| 4,062,328 | 12/1977 | Konno . |
| 4,318,312 | 3/1982 | Morimoto et al. . |
| 4,351,205 | 9/1982 | Fischer . |
| 4,355,550 | 10/1982 | Will et al. . |
| 4,365,526 | 12/1982 | Suga et al. . |
| 4,367,662 | 1/1983 | Greene .................................. 74/863 |
| 4,572,029 | 2/1986 | Kinugasa et al. . |
| 4,572,031 | 2/1986 | Yokooku et al. ...................... 74/866 |
| 4,589,302 | 5/1986 | Oda et al. . |
| 4,612,826 | 9/1986 | Greene .................................. 74/863 |

FOREIGN PATENT DOCUMENTS

| | | |
|---|---|---|
| 125555 | 9/1981 | Japan . |
| 166751 | 9/1984 | Japan .................................. 74/863 |

*Primary Examiner*—Michael Koczo
*Attorney, Agent, or Firm*—Oliff & Berridge

[57] ABSTRACT

A device integrally controls an engine having a supercharger and an automatic transmission. More specifically, boost pressure to the engine can be selectively introduced continuously or gradually, and oil pressure in a hydraulic control device of the automatic transmission is increased or decreased in accordance with the selected value of the boost pressure and an intake air temperature value. As a result, shift shock is low irrespective of output fluctuations of the engine due to a change in the boost pressure to and intake air temperature of the engine, and moreover, durability of the frictionally engaging devices is achieved.

15 Claims, 12 Drawing Sheets

$0 \sim ec \longrightarrow t = \frac{to-ts}{ec} e + ts$ $ec \sim \longrightarrow t = to$

FIG. 5 kgm

| Ne(rpm)<br>θ | 800~800 | 800~1000 | 1000~1500 | 1500~2000 | 2000~2500 | 2500~3000 | 3000~3500 | 3500~4000 | 4000~4500 | 4500~5000 | 5000~5500 | 5500~6000 | 6000~6500 | 6500~ |
|---|---|---|---|---|---|---|---|---|---|---|---|---|---|---|
| As0 | 0.4 | -0.2 | -0.8 | -1.6 | -2.6 | -3.0 | ← | ← | ← | ← | ← | ← | ← | ← |
| As1 | 2.0 | 1.5 | 1.0 | 0.8 | 0 | -0.6 | -1.4 | -2.4 | -3.0 | ← | ← | ← | ← | ← |
| As2 | 8.0 | 7.0 | 6.0 | 5.0 | 4.0 | 3.0 | 2.0 | 1.5 | 1.0 | 0.5 | 0.2 | 0 | -0.6 | -1.4 |
| As3 | 13.0 | 14.0 | 14.5 | 15.0 | 12.0 | 12.0 | 12.0 | 12.0 | 11.0 | 10.0 | 9.0 | 7.0 | 6.0 | 5.0 |
| As4 | 16.0 | 16.0 | 17.0 | 18.0 | 18.0 | 18.0 | 17.0 | 17.0 | 16.5 | 16.5 | 16.0 | 15.5 | 13.0 | 10.0 |
| As5 | ↓ | ↓ | ↓ | ↓ | ↓ | ↓ | ↓ | ↓ | ↓ | ↓ | ↓ | ↓ | ↓ | ↓ |
| As6 | ↓ | ↓ | ↓ | ↓ | ↓ | ↓ | ↓ | ↓ | ↓ | ↓ | ↓ | ↓ | ↓ | ↓ |
| As7 | 18.0 | 19.0 | 20.0 | 21.0 | 22.0 | 23.0 | 23.0 | 23.5 | 23.0 | 23.0 | 23.5 | 21.0 | 19.0 | 16.0 |

DEVICE FOR INTEGRALLY CONTROLLING A SUPERCHARGED ENGINE AND AUTOMATIC TRANSMISSION IN VEHICLE

BACKGROUND OF THE INVENTION

1. Field of the Invention

This invention relates to a device for integrally controlling an engine and an automatic transmission in a vehicle.

Automatic transmissions for vehicles, having gear shift mechanisms, a plurality of frictionally engaging devices, and hydraulic control devices operated to selectively switch the engagements of the frictionally engaging devices so that any one of a plurality of gear stages can be achieved, are well known in the transmission art.

In general, the frictionally engaging device is comprised of two sets of friction plate elements which are relatively rotatably supported and a hydraulic servo device for driving the friction plate elements. When oil pressure is fed to the hydraulic servo device, the two sets of the friction plate elements are strongly urged together so that both sets of the friction plate elements are frictionally engaged with sufficient force to transmit torque therebetween.

In general, the working oil pressure to the frictionally engaging devices is a line pressure. This line pressure has heretofore been controlled in accordance with a value to be regarded as typifying an engine load, such as for example, a throttle opening of the engine. More specifically, the control is carried out such that the line pressure increases with increasing engine load.

In the past, line pressure control was carried out such that throttle oil pressure which varied with the throttle opening was introduced into a control port of a primary regulator valve for controlling the line pressure. In such prior art embodiment, throttle oil pressure is generated by a throttle valve, which has a resilient force increasing with increasing accelerator pedal depression. In recent years, an electronically-driven automatic transmission has been developed, whereby essential portions of a control circuit are formed by an electronic circuit. In the electronically-driven automatic transmission of this type, information on the throttle opening is processed in the form of an electric signal, whereby the line pressure is controlled in response to an electric signal relating to the throttle opening (For example, in Japanese Utility Model Kokai (Laid-Open) No. 125555/1981).

In recent years, so-called superchargers have been attached to engines to improve the power characteristics thereof. Such superchargers deliver increased quantities of gasified fuel-air mixture to the cylinders of the engine, thereby raising the mean effective pressure during combustion so that output is improved for a given rotary speed. Known superchargers are driven by two methods: a mechanical driving method and an exhaust gas turbine driving method. The mechanical driving types utilize the rotational force of a crankshaft or the like of the engine, and are generally designated superchargers. The exhaust gas turbine driving types utilize engine exhaust gas energy and are generally designated turbochargers.

The intake air pressure flowing into the engine cylinder from the supercharger is known as the boost pressure. In general, when the boost pressure is excessively high, knocking tends to occur in gasoline engines, and durability is reduced in diesel engines. Consequently, boost pressure is typically controlled by a waste gate valve and an actuator so that the boost pressure can be normally held at a preset value. Although increasing boost pressure gives rise to increasing engine output, the fuel consumption is increased accordingly, whereby the fuel consumption rate is deteriorated. Because of this, there recently has been developed an engine system equipped with a supercharger, wherein this boost pressure is gradually or continuously changed in an active manner based upon the various operating conditions of the engine, so that a selective running may be performed with the emphasis being placed on output or fuel conservation.

However, when the engine boost pressure is continuously or gradually changed as described above, for a particular throttle opening or the engine speed, the engine torque inputted into the automatic transmission varies continuously or gradually. Conventional automatic transmissions cannot cope with this properly. Further, the output of supercharged engines fluctuates greatly with the intake air temperature, as compared to the normal aspirate engine. Because of this, if the operational intake air temperature is assumed to be low and the oil pressure in a hydraulic control device of an automatic transmission is thus set at a rather high value, then during operation at high intake air temperatures, shift shock increases due to the high value of the oil pressure. In the reverse case, if the operational intake air temperature is assumed to be high and the oil pressure is thus set at a relatively low value, then during operation at lower intake air temperatures, shift time duration will increase due to the low oil pressure, and wear of the frictionally engaging devices increases. To summarize the above, in supercharged engines, the degree of fluctuation of an engine output due to the change in the intake air temperature is combined with the degree of fluctuation of an engine output due to the change in the boost pressure, such that when the intake air temperature is high and the boost pressure is low, then shift shock is high. Furthermore, when the intake air temperature is low and the boost pressure is high, then the burden (work to be done) by the frictionally engaging devices is increased.

SUMMARY OF THE INVENTION

The present invention has been developed to obviate the above-described disadvantages of the prior art and has as its object the provision of a device for integrally controlling an engine and an automatic transmission in a vehicle, wherein shift shock is low irrespective of fluctuations of an engine output due to changes in boost pressure to the engine, and moreover, durability performance of frictionally engaging devices is high.

To achieve the above-described object, the present invention contemplates a device for integrally controlling an engine and an automatic transmission in a vehicle, comprising:

supercharging means for selectively continuously or gradually introducing boost pressure to the engine; and means for increasing or decreasing oil pressure in a hydraulic control device of an automatic transmission in association with at least the value of boost pressure selectively introduced by the supercharging means.

According to the present invention, the oil pressure in the hydraulic control device of an automatic transmission is controlled in association with at least the boost pressure to the engine, whereby the frictionally engaging devices can be operated by the oil pressure precisely following the fluctuations of the engine output, so that an automatic transmission, wherein the shift shock is low and the durability of the frictionally engaging devices is high, can be obtained.

In one embodiment, the oil pressure in the hydraulic control device is the line pressure, i.e. the basic oil pressure in the hydraulic control device.

In another embodiment, the oil pressure in the hydraulic control device is the transitional oil pressure being directly supplied to the frictionally engaging devices. With this arrangement, only the oil pressure most problematical from the viewpoint of the durability of the frictionally engaging devices and shift shock is efficiently and finely controlled.

In the latter embodiment, the transitional oil pressure may be increased or decreased by increasing decreasing back pressure of an accumulator.

In the preferred embodiment, the oil pressure in the hydraulic control device is the line pressure and the transitional oil pressure being directly supplied to the frictionally engaging devices.

In the preferred embodiment, selective introduction of the boost pressure is automatically performed in association with at least one of the engine intake air temperature, engine oil temperature, engine cooling water temperature, oil temperature of the automatic transmission, speed of depression of an accelerator, intake air quantity per turn of the engine, steering turning angle, shift frequency and select position of shift range of the automatic transmission.

In one embodiment, the supercharger means is of the mechanical driving type supercharger, and the oil pressure in the hydraulic control device is increased or decreased in association with an ON-OFF signal of a clutch for selectively driving the mechanical driving type supercharger.

In the preferred embodiment, the oil pressure in the hydraulic control device is increased or decreasingly set in association with at least values of the boost pressure and the intake air temperature.

Additionally, the present invention is applicable to any automatic transmission, including an automatic transmission comprising a torque converter and a gear mechanism, an automatic transmission comprising an electromagnetic powder clutch and a gear shift mechanism, an automatic transmission comprising an electromagnetic powder clutch, a gear shift mechanism and a transfer, and an automatic transmission comprising a continuously variable transmission using belts, etc. and a gear mechanism.

BRIEF DESCRIPTION OF THE DRAWINGS

The above objects, features and advantages of the present invention, as well as other objects and advantages thereof, will become more apparent from the description of the invention which follows, taken in conjunction with the accompanying drawings, wherein like reference characters designate the same or similar parts and wherein.

DESCRIPTION OF THE PREFERRED EMBODIMENTS

The present invention will be described in detail with reference to the accompanying drawings which illustrate preferred embodiments of the present invention.

Figure 1:
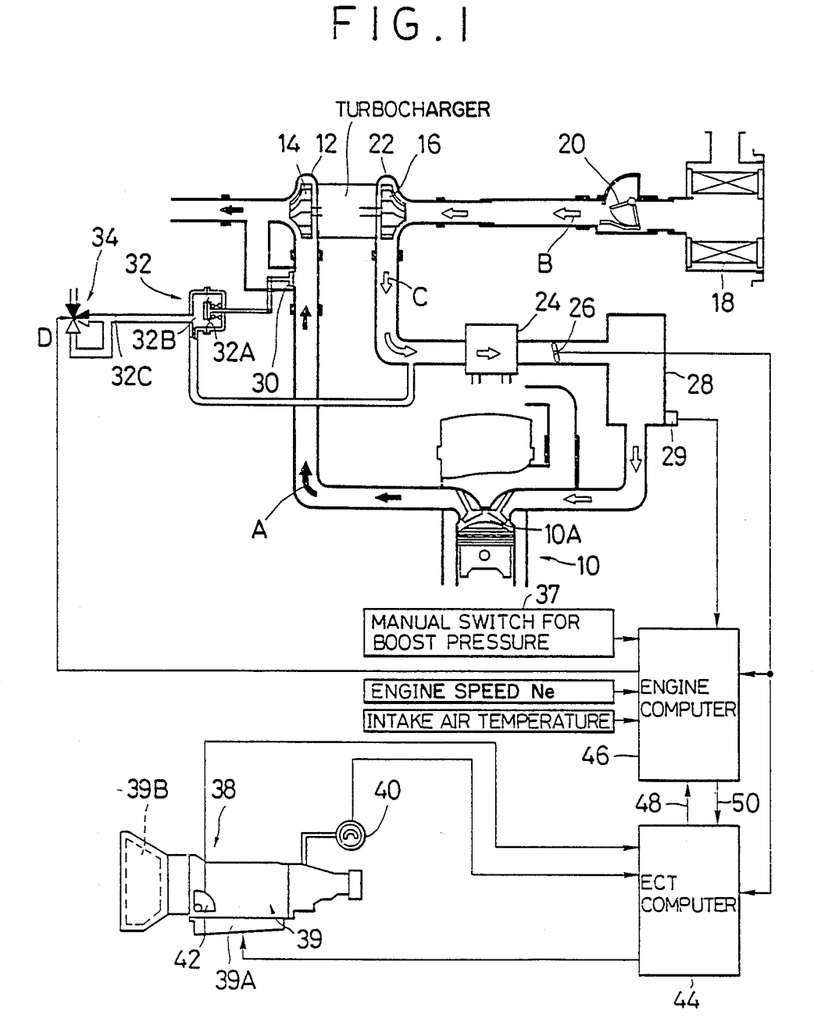
FIG. 1 is a skeleton diagram showing the general arrangement of an engine having a supercharger and an automatic transmission in a vehicle, to which is applied a first embodiment of the device for integrally controlling an engine and an automatic transmission in a vehicle according to the present invention.

FIG. 1 shows one embodiment of the device for integrally controlling an engine and an automatic transmission in a vehicle according to the present invention.

First, the intake system (refer to the top portion of FIG. 1) of an engine 10 equipped with a supercharger is described.

Exhaust gas A from the engine 10 acts on a turbine 14 in turbine housing 12 to turn the same. Rotation of the turbine 14 rotates a compressor 16 fixed coaxially with the turbine 14. Intake air B which has passed through an air cleaner 18 and an air flow meter 20 is compressed by compressor 16, and delivered to an intercooler 24 from a compressor housing 22 as supercharged air C. The intercooler 24 cools the supercharged air C discharged from the compressor 16, whereby air density is raised to improve the intake efficiency and gas temperature in the combustion chamber is lowered to prevent knocking from occuring. Designated as 26 is a throttle valve, 28 is a surge tank and 29 is a pressure monitoring sensor.

When the engine speed increases, the exhaust gas quantity is increased, thus increasing the rotary speed of the turbine (about 20,000 rpm–110,000 rpm), and the boost pressure as well. As a consequence, the engine output is increased accordingly and the power characteristics increase.

Although high output is obtained by supercharging, when the boost pressure is excessively raised, knocking tends to occur in a gasoline engine and the durability is decreased in diesel engines. Also when the boost pressure is raised to improve the power characteristics, the fuel consumption, increases and fuel consumption rate naturally deteriorates. Accordingly, the upper limit of the boost pressure is set by a waste gate valve 30 and a predetermined upper limit boost pressure may be set.

The waste gate valve 30 causes part (or all) of the exhaust gas A from the engine 10 to bypass the turbine 14. With this arrangement, output from the turbine 14 is lowered to control the boost pressure. The waste gate valve 30 is operated by an actuator 32 and a vacuum switching valve 34.

The vacuum switching valve 34 is a solenoid valve and is ON-OFF operated in response to an electric signal D from an engine computer 46. This electric signal D is outputted in operational association with a manual switch 37 controlled by the vehicle driver. The vacuum switching valve 34, when turned ON, allows a chamber 32B defined by a diaphragm 32A of the actuator 32 to communicate with atmospheric pressure, and, when turned OFF, cuts off communication between the chamber 32B and atmospheric pressure. More specifically, when the vacuum switching valve 34 is turned OFF, pressure at the outlet portion of the compressor 16 directly acts on the diaphragm 32A of the actuator 32, whereby the waste gate valve 30 is opened at a relatively low set pressure, so that the boost pressure can be held to a low set pressure. On the other hand, when the vacuum switching valve 34 is turned ON, part of the pressure acting on the diaphragm 32A is released to atmosphere through an orifice 32C. Thus, even if the discharge pressure from the compressor 16 reaches the aforesaid set pressure, the waste gate valve 30 does not open, so that the boost pressure is maintained at the upper limit pressure as commensurate to an air quantity thus released.

An automatic transmission 38 is shown in the bottom portion of FIG. 1. This automatic transmission 38 comprises a hydraulic control device 39A, a main body 39, including a torque converter 39B, a vehicle speed sensor 40, a shift position sensor 42 and the like. An ECT computer 44 controls the main body 39 of the automatic transmission in response to vehicle speed, throttle opening signal, a signal from the manual switch 37 and the like. The ECT computer 44 for controlling the main body 39 of automatic transmission and the engine computer 46 for controlling the engine 10 are connected to each other through communication lines 48 and 50, so that information can be exchanged therebetween. Additionally, the engine computer 46 receives input signals relating to the engine speed Ne, the intake air temperature TH and the like.

Figure 2:
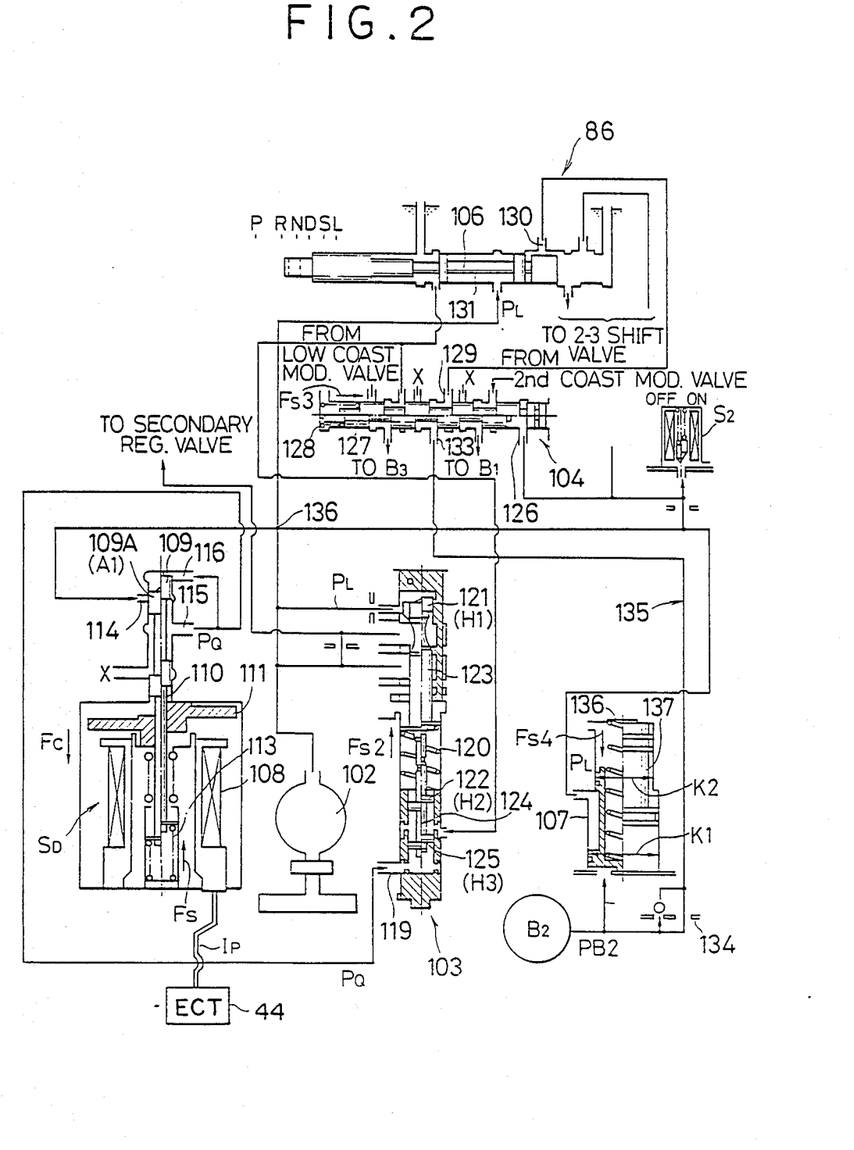
FIG. 2 is a hydraulic circuit diagram showing the essential portions of the hydraulic control device in the above automatic transmission.

FIG. 2 shows the essential portions of hydraulic control device 39A.

In the drawing, designated as SD is the electromagnetic proportion valve, 102 is a pump, 103 is the primary regulator valve, 104 is the 1-2 shift valve (valve for changing between 1st gear stage and 2nd gear stage), S2 is the solenoid valve, 106 is a manual valve operated by a driver and 107 is an accumulator for controlling the transition characteristics when the oil pressure is supplied to or removed from the brake B2, which is one of the frictionally engaging devices.

The electromagnetic proportion valve SD is well known by itself and comprised of spools 109 and 110, a coil 108, a spring 113, a plunger 111 and the like. The spool 110 and the plunger 111 are interconnected to be movable in the axial direction. The coil 108 exerts a force Fc directed downwardly in the drawing to the plunger 111 (namely, the spool 110) in accordance with load current Ip from the ECT computer 44. On the other hand, the spring 113 exerts a force Fs, in a reverse direction to the above, to the spool 110. A discharge pressure from the pump 102 acts on port 114. The oil pressure PQ acting on ports 115 and 116 is defined in equation (1), wherein A1 is the face area of a land 109A of the spool 109:

$$PQ = (Fs - Fc)/A1 \tag{1}$$

As a consequence, the force Fc directed downwardly in the drawing, which is generated by the coil 108, is controlled, so that the oil pressure PQ generated at the port 115 can be controlled to a desirable value from zero to Fs/A1. Oil pressure PQ corresponds to a so-called throttle pressure which has heretofore been normally generated by a throttle valve, wherein a spool is mechanically drivable through a cam in relation to a throttle opening. Oil pressure PQ acts on a port 119 of primary regulator valve 113 to control the line pressure.

The primary regulator valve 103 generates a line pressure PL related to the value of the control pressure PQ in a conventional manner. The load current Ip to the coil 108 is controlled in association with the boost pressure and the like, in response to a command from the ECT computer 44, so that the line pressure PL is desirably controlled to reflect the boost pressure. The equation relating to the pressure regulation in the primary regulator valve 103 is as follows:

$$PL = \{Fs2 + (H2 - H3)PR + H3 \cdot PQ\}/H1 \tag{2}$$

where in Fs2 is an acting force of a spring 120, H1-H3 are face areas of lands 121, 122 and 125 of spools 123 and 124, and PR is the line pressure applied to the lands 122 and 125 when the manual valve 106 is in the reverse range.

The frictionally engaging devices and related components are hereinafter described. The brake B2 is described as typifying the frictionally engaging devices.

A signal pressure of the solenoid valve S2 acts on a port 126 of the 1-2 shift valve 104. As a consequence, spool 127 of the 1-2 shift valve 104 slides to the right and left in the drawing in accordance with the ON-OFF operation of the solenoid valve S2. The force Fs3 from a spring 128 urges the spool to the right. Ports 133 and 129 in the 1-2 shift valve 104 are connected to each other when the spool is in the rightward position. The line pressure PL from a port 130 of the manual valve 106 acts on the port 129 in the D (drive) range. More specifically, the ports 130, 129 and 133 are adapted to be connected to one another in the D range selection position of the spool 131 of the manual valve 106. The port 133 is connected to the brake B2 through an oil line 135 and a check valve 134. As a consequence, in the D range, the line pressure PL is supplied to or removed from the brake B2 in accordance with the ON-OFF operation of the solenoid valve S2.

The oil line 135 is connected with an accumulator 107, to control the transitional oil pressure level when the line pressure PL is supplied to or removed from the brake B2. The oil pressure PB2 when accumulator 107 is working is derived in relation to the line pressure PL applied as the back pressure in accordance with the following equation.

$$PB2 = Fs4 + (K1 - K2)PL/K1 \tag{3}$$

wherein Fs4 is an acting force of spring 136, and K1 and K2 are face areas of two lands of an accumulator piston 137.

Because the control oil pressure PQ is controlled by the load current control to the electromagnetic proportion valve 101 through the above-described equations (1)–(3), the oil pressure PB2 to the brake B2 can be desirably controlled in relation to the boost pressure during transitional times of shifting, as well as other non-shifting times.

Figure 3:
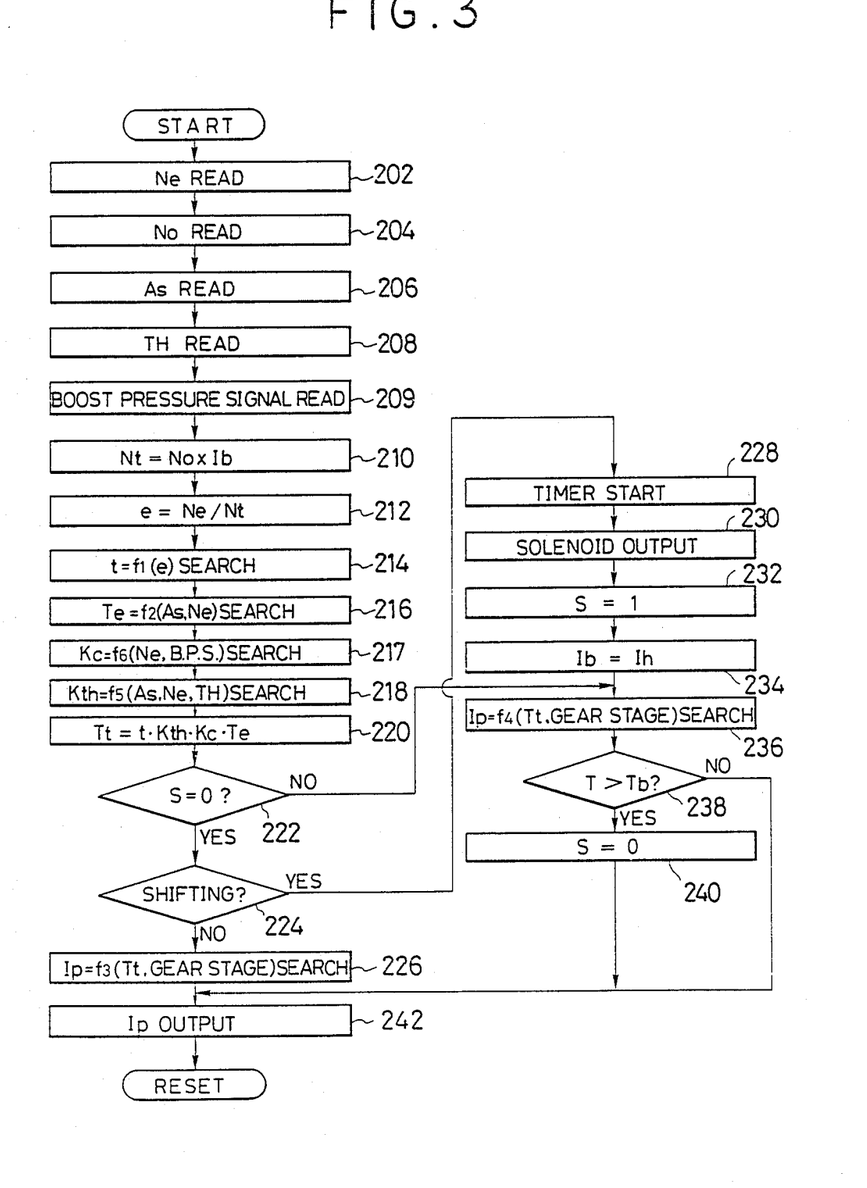
FIG. 3 is flow chart showing a control routine.

FIG. 3 shows a control flow chart for the device of the above embodiment. In this embodiment, the boost pressure may be reflected in the estimate of the turbine torque, and the oil pressure in the hydraulic control device is determined in association with the estimated turbine torque. The oil pressure is determined in association with the turbine torque for the reasons hereinafter described.

The torque capacity transmitted by the frictionally engaging devices should be basically determined by the turbine torque, and not by the engine load (engine output). The turbine torque fluctuates greatly due to the torque characteristics of the engine or the characteristics of the torque converter. Consequently, turbine torque does not necessarily correspond to the engine load. Thus, if the oil pressure is determined in association with the engine load, then, in certain circumstances the line pressure will be raised beyond necessity. Because, in designing an automatic transmission, it is necessary to secure a factor of safety which accounts for all potential operational conditions of the automatic transmission, when the line pressure is raised beyond necessity, problems result, such as high power loss in the pump, increased shift shock, and roughness during shifting.

Furthermore, the automatic transmission brought into the matching engine load cannot be applied to other engines having different torque characteristics, and consequently, becomes usable only for a specific engine, thus minimizing universal applicability of the transmission for all engines or many engine types.

In view of the above-described disadvantages of setting oil pressure based on engine load, in this embodiment, the oil pressure in the hydraulic control device is set in association with the turbine torque.

Although it is most effective to directly detect the turbine torque by use of a torque sensor and the like, it is very difficult to attach a torque sensor to detect the actual turbine torque in the automatic transmission because of space limitations. As a consequence, in this embodiment, the turbine torque is estimated. In carrying out this estimation, the boost pressure is taken into consideration.

With reference to FIG. 3, the flow chart will be described in greater detail.

Figure 4:
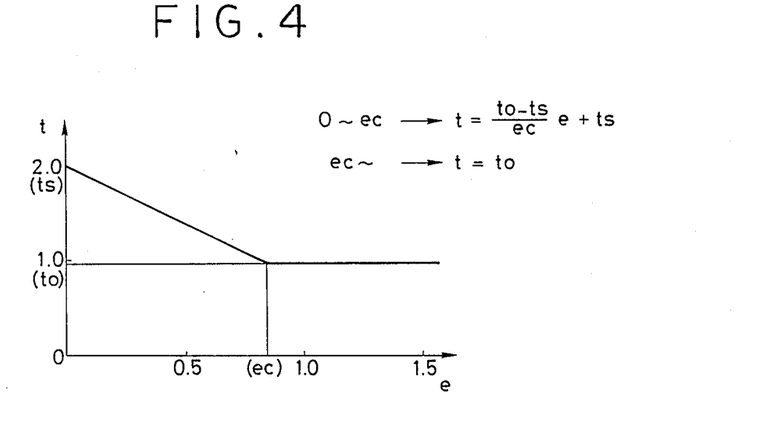
FIG. 4 is a chart showing the relationship between a speed ratio e and a torque ratio t.

First, in Steps 202–209, the engine speed Ne, a rotary speed No of the output shaft of the automatic transmission, the throttle opening As, the intake air temperature TH and the high-low signal of the boost pressure from the manual switch 37 are read in, respectively. In Step 210, a turbine rotary speed Nt is calculated from the product of the gear ratio Ib of the current gear stage and the rotary speed No of the output shaft. In Step 212, a speed ratio e is determined from a quotient of the engine rotary speed Ne and the turbine rotary speed Nt. Further, in Step 214, a torque ratio t is determined from the speed ratio e. For example, the relationship between the speed ratio e and the torque ratio t may be determined as shown in FIG. 4. In FIG. 4, "ts", "ec", "to" are constants previously stored in the ECT computer 44. Referring to the drawings, ts=2.0, ec=0.84 and to=0.98.

Figure 5:
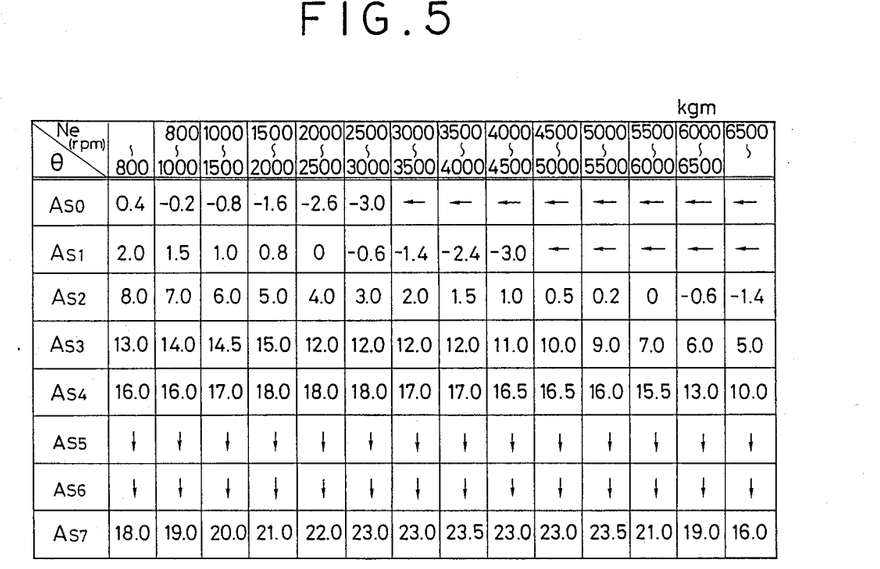
FIG. 5 is a chart showing an example of a map of engine torque Te.

In Step 216, an engine torque Te is determined from the engine speed Ne and the throttle opening As. FIG. 5 shows an example of a map of engine torque Te.

Figure 6:
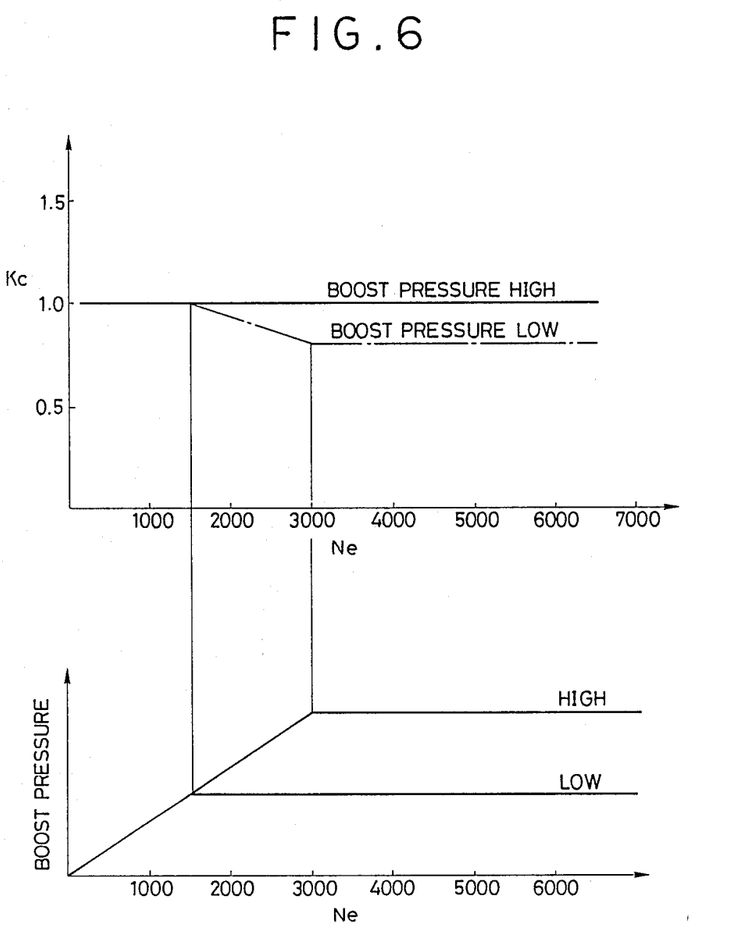
FIG. 6 is a chart showing the relationship between the boost pressure, the engine speed and the boost pressure correction coefficient.

In Step 217, a boost pressure correction coefficient Kc of the engine torque is determined from the engine speed Ne and the high-low signal from the manual switch 37. FIG. 6 shows the characteristic relationship between this Kc and the boost pressure. In the example shown, the influence of the engine speed Ne on the boost pressure correction coefficient Kc is constant on the high signal's side, and appears at 1,500 rpm or more on the low signal's side (one-dot chain line).

Figure 7:
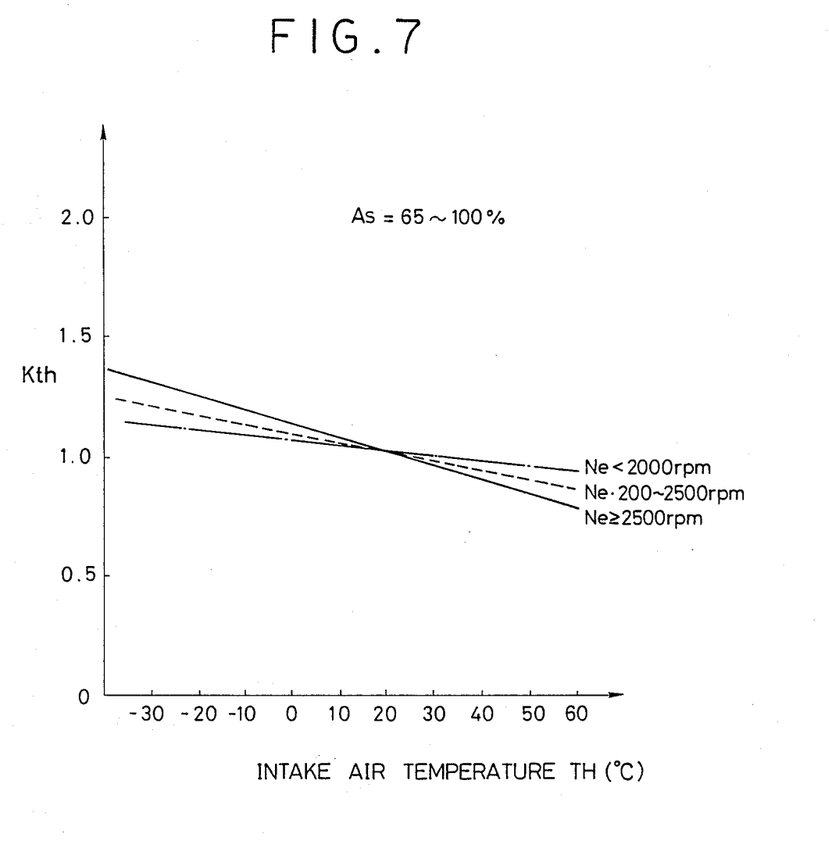
FIG. 7 is a chart showing an example of the determination of the intake air temperature correction coefficient.

In Step 218, an intake air correction coefficient Kth of the engine torque Te is determined as a function of the throttle opening As, the engine speed Ne and the intake air temperature TH. FIG. 7 shows this example. In the example in FIG. 7, the intake temperature 20° C. is referenced therefrom, and the engine speed Ne is made to be a parameter.

In Step 220, a turbine torque Tt is determined from the product of the engine torque Te, the torque ratio t, the boost pressure correction coefficient Kc, and the intake air correction coefficient Kth.

Figure 8:
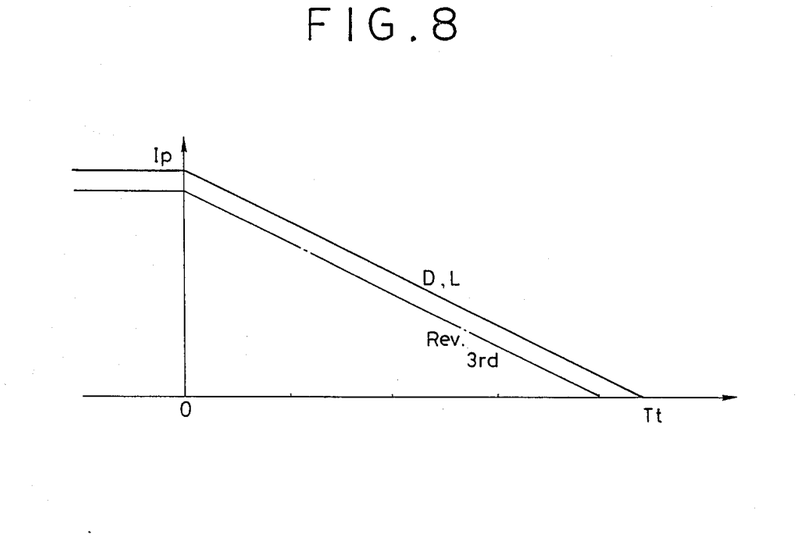
FIGS. 8 and 9 are charts showing the relationship between turbine torque Tt, output currents Ip and Ip' to the electromagnetic proportion valve.

Designated at S in Step 222 is a flag for controlling the flow. When S=0, a determination is made as to whether or not the transmission is shifting in Step 224. If not, then the load current Ip to the electromagnetic proportion valve SD is determined in Step 226, from the type of gear stage and the turbine torque Tt. FIG. 8 shows an example of the relationship between Ip-Tt and the gear stages.

On the other hand, if it is determined that the transmission is shifting in Step 224, then a timer T to be referenced in Step 238 is started in Step 228, a shifting output is delivered to a solenoid valve in Step 230, the flag S is set at 1, and the gear ratio Ib is set at Ih. Here, Ib is a gear ratio to be referenced in Step 210 and Ih is a gear ratio of the gear stage after shifting has been completed.

Figure 9:
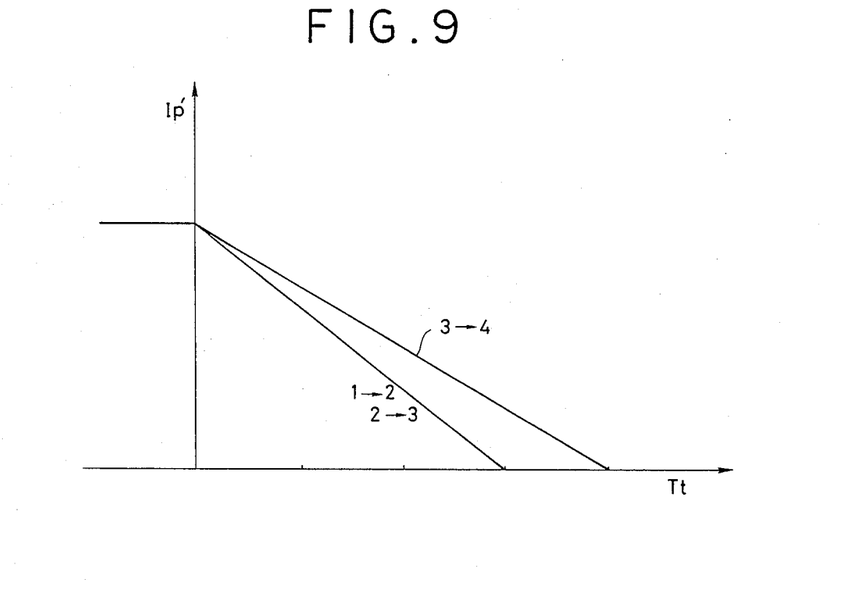

In Step 236, the load current Ip' is determined from the type of shifting and the turbine torque Tt. FIG. 9 indicates the relationship between the type of shifting and the turbine torque Tt.

In Step 238, a determination is made as to whether a predetermined time period Tb has elapsed after the timer start in Step 228 or not. If not, the routine is left as it is. If the predetermined time period has elapsed, then the flag S is cleared (Step 240) and the routine proceeds to Step 242.

As a result, during the predetermined time period Tb including the shifting, the flow proceeds in the order of Steps 222-236-238-242 and a load current Ip' different from the one during non-shifting time periods is set.

In this embodiment, both the line pressure of the automatic transmission and the transient oil pressure when the line pressure is supplied to the frictionally engaging devices are set in association with the turbine torque. Furthermore, the boost pressure and the intake air temperature are reflected in the hydraulic control device, so that an oil pressure of necessary and sufficient quantity is constantly generated. As a result, the power loss in the pump is low, the shift shock is low, and wear of the frictionally engaging devices is reduced, i.e. they are more durable.

Figure 10:
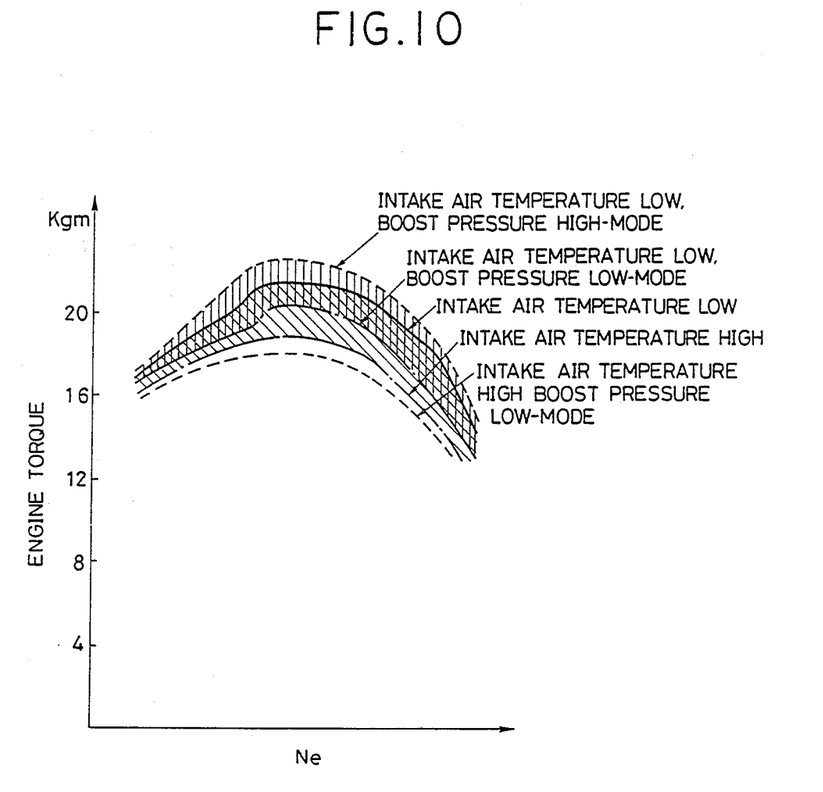
FIG. 10 is a chart showing the influences of the boost temperature and the intake air temperature to the engine torque.

Additionally, FIG. 10 shows a characteristic example of the engine torque at the time of selecting the high-low modes of the boost pressure. In the drawing, a solid line and a one-dot chain line show the influence of the intake air temperature (a hatched portion in the drawing). A long broken line and a two-dot chain line show the engine torques in the high-low modes of the boost pressure when the intake air temperature is low (a vertical line portion in the drawing). As a consequence, a considerable change in engine torque occurs between the mode where the intake air temperature is low and the boost pressure is high and the mode where the intake air temperature is high and the boost pressure is low. However, in this embodiment, not only the high-low boost pressures but also the high-low intake air temperatures are taken into consideration, so that the influence of the fluctuations in the engine torque can be reflected more properly in controlling the oil pressure in the hydraulic control device.

The second embodiment of the present invention will hereinafter be described.

In this second embodiment, the transitional oil pressure being supplied to the frictionally engaging devices is set in association with the engine load (throttle opening As), the boost pressure and the intake air temperature TH. More specifically, in this second embodiment, the line pressure system is the same as in conventional automatic transmissions, and the transitional oil pressure applied to the frictionally engaging devices during shift is varied by varying the back pressure of an accumulator.

First, the essential portions of the hydraulic control circuit for carrying out this control will be described with reference to FIG. 11.

In the drawing, designated at S4 is an ON-OFF solenoid valve operated at high speed in response to a command from the ECT computer 44, 300 is a duty valve for reducing the line pressure in accordance with the ratio between the ON-OFF time durations of the solenoid valve S4, 400 is a pressure regulator valve for outputting oil pressure acting on the duty valve 300, 500 is an accumulator provided in an oil line between a shift valve (not shown) and the brake B2, for controlling the transition characteristics of the oil pressure to the brake B2, 600 is an accumulator provided in an oil line to the clutch C2 and OS is an oil strainer.

The solenoid valve S4 has a drain port 331. When turned ON in response to an output signal from the ECT computer 44, solenoid valve S4 generates oil pressure in an oil line 332, and, when turned OFF, drains the oil in the oil line 332 through the drain port 331.

The duty valve 300 is provided with a spool 304 including lands 301–303 having face areas D1–D3 (D1<D2=D3), respectively. Furthermore, the duty valve 300 is provided with a first input port 305, to which is applied the line pressure PL, a second input port 306, to which is applied output oil pressure P1 from the pressure regulator valve 400, a third input port 308, to which is inputted the output oil pressure P1 from the pressure regulator valve 400 through an orifice 307, and further, an output port 309 to back pressure chambers 502 and 602 of the accumulators 500 and 600.

The pressure regulator valve 400 of a type well known in the art and is provided with a spool 403 including lands 401 and 402 having face areas E1 and E2, respectively, an input port 404, to which is applied the line pressure PL and an output port 405.

The fundamental operation of this embodiment will hereinafter be described.

The pressure regulator valve 400 regulates the line pressure PL applied to the input port 404 to a predetermined pressure P1, which is lower than the line pressure, in a well known manner. This predetermined pressure P1 is set by a spring 406. This oil pressure P1 is applied to the second input port 306 of the duty valve 300, and further, is applied to the third input port 308 through an orifice 307.

When the solenoid valve S4 is turned OFF in response to a command from the ECT computer 44, the oil in the oil line 332 is drained through the drain port 331, whereby the spool 304 of the duty valve 300 is brought into a state as shown in the left side of the drawing due to a difference between the face areas D1 and D2 of the land 301 and 302. As a consequence, the line pressure PL applied to the first input port 305 is outputted through the output port 309.

When the solenoid valve S4 is turned ON in response to a command from the ECT computer 44, the drain port 331 of the solenoid valve S4 is closed, whereby the oil pressure P1 outputted from the output port 405 of the pressure regulator valve 400 is generated at the oil line 332 due to the presence of the orifice 307. As a result, the spool 304 of the duty valve 300 is subjected to an upwardly directed force (having a value of D3×P1) to be brought into the state as shown in the right side in the drawing, whereby the output port 309 is closed and the oil pressure PA in the output ports disposed thereafter is lowered.

Thus, when the solenoid valve S4 is operated ON-OFF at a high-frequency, the ratio between the "ON" and "OFF" time durations in one cycle (duty ratio) is varied. As the result, the oil pressure PA at the output port 309 can be desirably set at a value commensurate to the ratio (duty control). As a consequence, the solenoid valve S4 is operated ON-OFF by the ECT computer 44 and the duty ratio of the solenoid valve S4 is varied in accordance with the throttle opening, the boost pressure and the intake air temperature, so that the oil pressure PA in the back pressure chambers of the accumulators can be desirably controlled.

The oil pressure (transitional oil pressure) PM in the frictionally engaging devices during operation of the accumulator 500 (or 600) may be represented by the following equation, in general.

$$PM = (F1 - F2)PA/F1 + Fs/F1 \qquad (4)$$

wherein F1 is an area of the large diameter side of an accumulator piston 501 (or 601), and F2 is an area of the small diameter side of the accumulator piston 501 (or 601). As is apparent from the above equation, the back pressure PA of the accumulator 500 (or 600) is controlled, so that the oil pressure PM in the frictionally engaging devices during working of the accumulator can be desirably varied.

Additionally, the accumulator spring 504 (or 604) of the accumulator 500 (or 600) can be dispensed with. Namely, the accumulator piston 501 (or 601) can be made to be pushed back by the back pressure PA.

Figure 11:
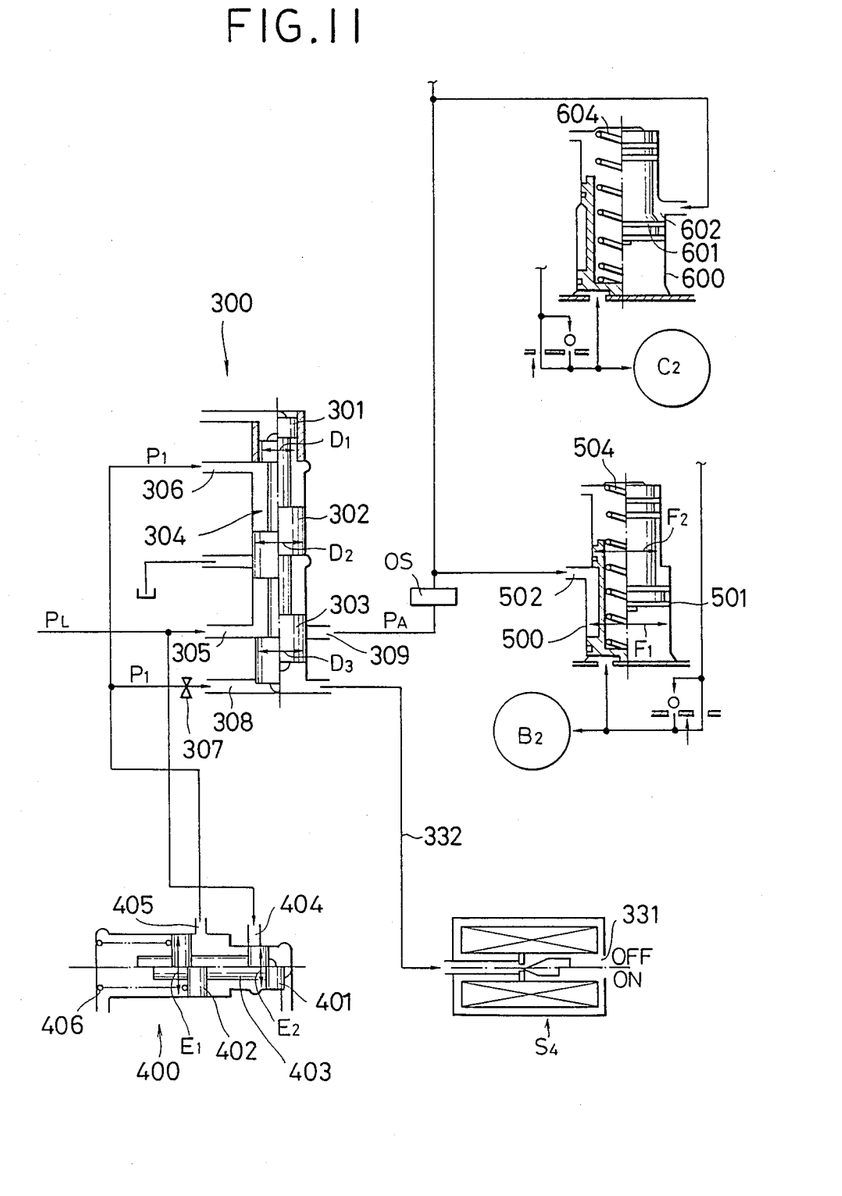
FIG. 11 is hydraulic circuit diagram showing the essential portions of a second embodiment of the present invention.

FIG. 11, shows only the accumulator 500 provided in the oil line to the brake B2 and the accumulator 600 provided in the oil line to the clutch C2. However, the output oil pressure PA from the duty valve 300 may be preferably led to the back pressure chambers of the accumulators provided in the oil line directed to other brakes or clutches in addition to the above.

Two types of solenoid valves may be utilized in the present device. One such type generates oil pressure during "ON" conditions and the other type is for generating oil pressure in the "OFF" conditions. Although both types are adaptable in this embodiment, the type which generates oil pressure during the "ON" conditions is adopted. This type is advantageous from the fail-safe viewpoint since, when disconnection or the like occurs in the wiring for ON-OFF operating the solenoid valve S4, the spool 304 of the duty valve 300 is brought into a state as shown in the left side of the drawing, and the line pressure PL is applied to the output port 309, fixing to a rather high value.

Figure 12:
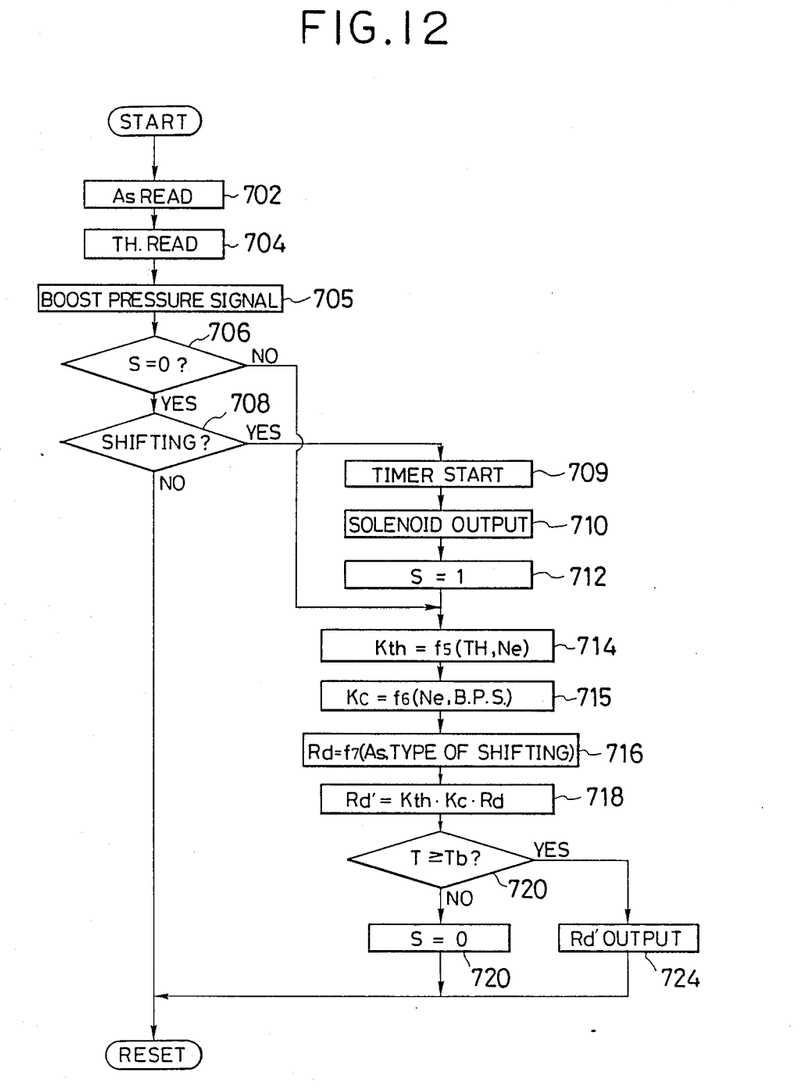
FIG. 12 is a flow chart showing a control routine.

FIG. 12 shows the control flow in the above-described device.

In Steps 702 through 705, the throttle opening As, the intake air temperature TH and the boost pressure are read in. Since the flag S is first set at zero, the determination in Step 706 is initially yes, and, in Step 708, a determination is made as to whether or not the transmission is shifting. If not, then reset is made directly, and no particular oil pressure operation in the hydraulic control device is performed. If the transmission is determined to be shifting, then a timer T to be referenced in Step 720 is started in Step 709, an output to the solenoid for the shifting is made in Step 710, and the flag S is set at 1 in Step 712.

On the other hand, in Step 714, the intake air temperature correction coefficient Kth is determined based upon the intake air temperature TH, the throttle opening As and the engine speed Ne in the same manner as in Step 218 of the first embodiment. In Step 715, the boost pressure correction coefficient Kc is determined from the signal of high-low of the boost pressure and engine speed Ne in the same manner as in Step 217 of the first embodiment. In Step 716, the duty ratio Rd for controlling the back pressure is searched from the throttle opening As and the type of shifting. In Step 718, this duty ratio Rd is corrected by the intake air correction coefficient Kth and the boost pressure correction coefficient Kc into Rd'.

In Step 720, a determination is made as to whether, or not a predetermined time period Tb has elapsed. If the predetermined time period Tb has not elapsed, then the corrected Rd' is outputted and reset is made. If the predetermined time period Tb has elapsed, then the flag S is set to zero (Step 722) and reset is made.

In this second embodiment, only the transient oil pressure PM when the oil pressure is directly supplied to the frictionally engaging devices during shift is set in association with the boost pressure, the intake air temperature TH and the throttle opening As. As a result, the flow is simplified and the burden on the computer is relieved, while still achieving finer transient oil pressure regulation resulting in decreased shift shock and improved durability of the frictionally engaging devices.

Figure 13:
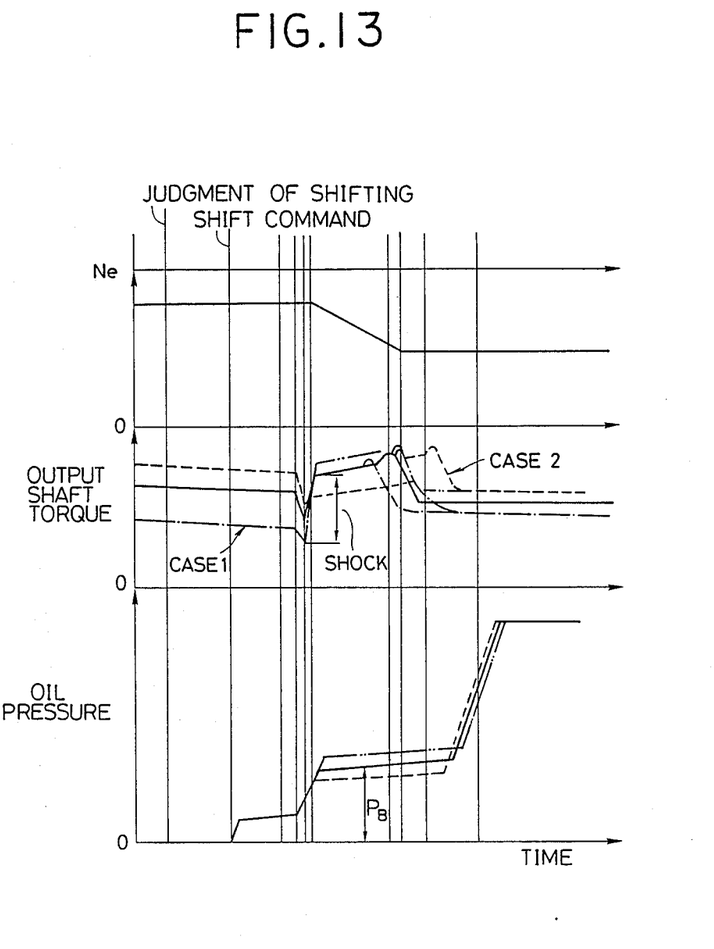
FIG. 13 is a shift transition characteristics chart qualitatively showing the effects of the first embodiment.

FIG. 13 qualitatively shows the effects of the first embodiment. For easier understanding, in the drawing, the turbine torque does not fluctuate during shifting. In the drawing, indicated by solid lines are the conventional examples of the shift characteristics, wherein the oil pressure PB is constant relative to the throttle opening irrespective of the turbine torque Tt. As a consequence, in the case of the one-dot chain line, where the boost pressure is low, the intake air temperature is high, the turbine torque is low (case 1), resulting in shortened shift time duration and thus increased shift shock. In the case of the broken line, where the boost pressure is high, the intake air temperature is low (case 2), the shift time duration is prolonged, thus degrading the durability of the frictionally engaging devices. In the first embodiment, wherein in setting the oil pressure in association with the turbine torque, the boost pressure and the intake air temperature are taken into consideration, the oil pressure PB is increased or decreased with the rise or fall of the boost pressure, or the intake air temperature. As a consequence, satisfactory shift characteristics are secured as indicated by the long broken line in the aforesaid case 1 and as indicated by the two-dot chain lines in the aforesaid case 2, respectively.

In accordance with the present invention, several variations are conceivable, some of which are discussed below.

First, in the first embodiment, the oil pressure set in association with the boost pressure (and the intake air temperature) is the line pressure in the hydraulic control device, and the line pressure (or oil pressure relating to the line pressure) has been adopted as the back pressure in the accumulator. Furthermore, not only the oil pressure in the frictionally engaging devices at the time of non-shifting but also the transitional oil pressure being supplied to the frictionally engaging devices have been set in association with the boost pressure (and intake air temperature). However, according to the present invention, the oil pressure set in association with the boost pressure may be only the line pressure. Furthermore, as shown in the second embodiment, only the transitional oil pressure being supplied to the frictionally engaging devices during shifting may be set in association with the boost pressure, with the line pressure being left in the same manner as in conventional transmissions.

Next, in the first embodiment, the oil pressure has been set based at least in part upon the turbine torque and the turbine torque has been estimated as related to the engine torque and the boost pressure. However, according to the present invention, as shown in the second embodiment, estimation of the turbine torque, although advantageous, is not necessarily required, and the factor upon which the oil pressure is set in accordance therewith need not necessarily be limited.

In addition to the throttle opening, many other factors may be adopted when the oil pressure is set in association with the engine load, such as intake air quantity per turn of the engine, engine negative pressure or the like.

Furthermore, in the above embodiments, electromagnetic proportion valves or duty control valves have been advantageously adopted as the means for specifically controlling the oil pressure in association with the boost pressure. However, the present invention should not be limited to such disclosed means for controlling the oil pressure.

Further, in the above embodiment, the boost pressure is actuated by a manual switch operated by the user. However, according to the present invention, the means used to change the boost pressure need not necessarily be limited. For example, introduction of the boost pressure may be automatically performed by at least one of those including the engine intake air temperature, the engine oil temperature, the engine cooling water temperature, the oil temperature of the automatic transmission, the speed of depression of the accelerator, the intake air quantity per turn of the engine, the steering turning angle, the shifting frequency and the select position of the shift range of the automatic transmission.

Figure 14:
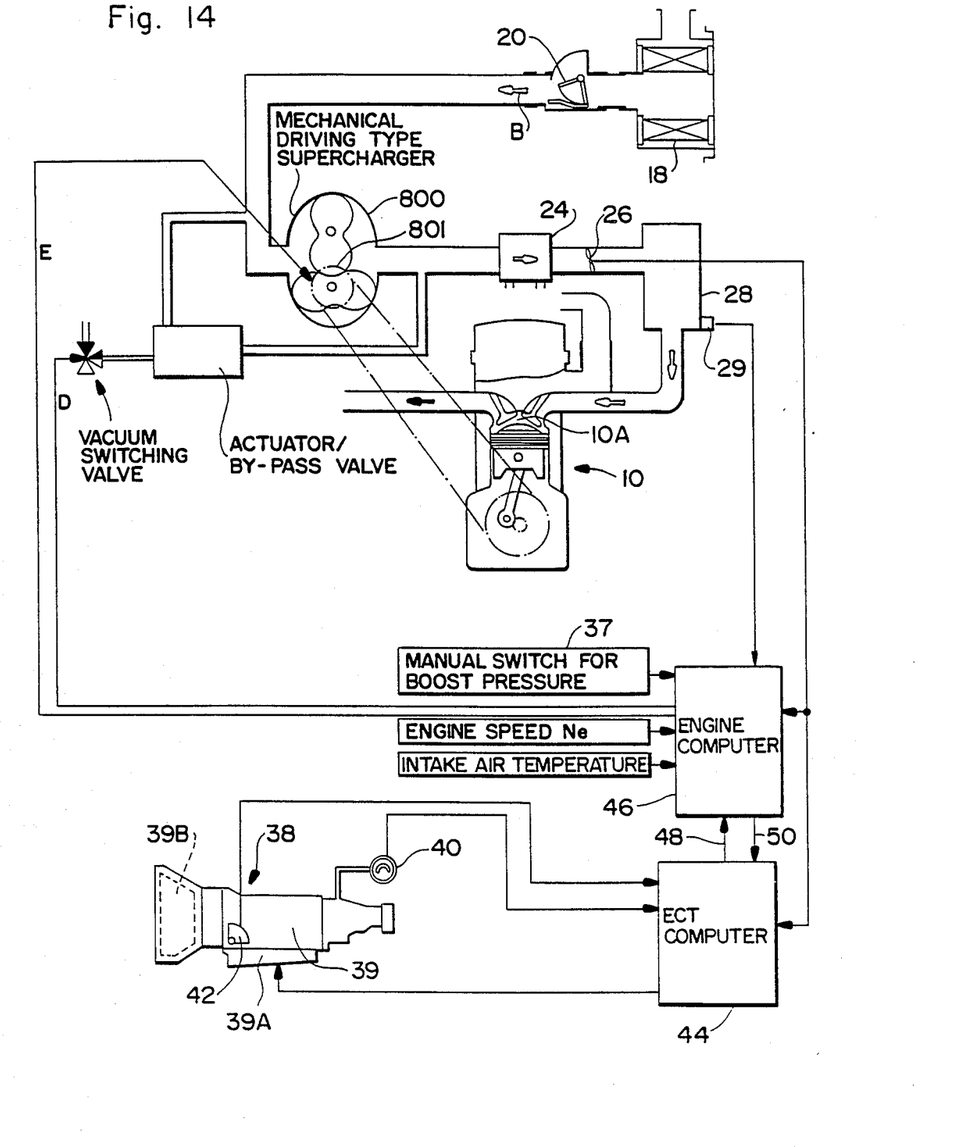
FIG. 14 is a diagram similar to FIG. 1 but depicting a mechanical driving type supercharger.

Furthermore, in the above embodiment, there has been shown the exhaust gas turbine driving type supercharger as the supercharging means. However, the supercharging means according to the present invention need not necessarily be limited to this, and the mechanical driving type supercharger 800 (FIG. 14) may be adopted. In such a case, the oil pressure in the hydraulic control device may be increased or decreased in association with an ON-OFF signal E to the clutch 801 for selectively driving the mechanical driving type supercharger.

What is claimed is:

1. A device for integrally controlling an engine and an automatic transmission in a vehicle, comprising:
   supercharging means for selectively continuously or gradually introducing boost pressure to said engine;
   means for detecting intake air temperature; and
   means for increasing or decreasing oil pressure in a hydraulic control device of said automatic transmission in association with at least the values of said intake air temperature and said boost pressure selectively introduced by said supercharging means.

2. An integrally controlling device as set forth in claim 1, wherein said oil pressure in said hydraulic control device is a line pressure.

3. An integrally controlling device as set forth in claim 1, further comprising frictionally engaging devices for selectively setting various gear stages in said automatic transmission, wherein said oil pressure in said hydraulic control device is a transitional oil pressure being directly supplied to one of said frictionally engaging devices.

4. An integrally controlling device as set forth in claim 3 further comprising at least one accumulator connected with said frictionally engaging devices, wherein said transitional oil pressure is increasingly or decreasingly set with an increase or decrease of back pressure in said accumulator.

5. An integrally controlling device as set forth in claim 1, further comprising frictionally engaging devices for setting various gear stages, wherein said oil pressure in said hydraulic control device is a line pressure and a transitional oil pressure being directly supplied to one of said frictionally engaging devices.

6. An integrally controlling device as set forth in claim 1, wherein said supercharging means includes means for introducing the boost pressure automatically in association with a parameter selected from the group consisting of an intake air temperature of said engine, oil temperature of said engine, cooling water temperature of said engine, oil temperature of said automatic transmission, speed of depression of an accelerator of said vechicle, intake air quantity per turn of said engine, steering turning angle of said vehicle, shift frequency of said automatic transmission and select position of shift range of said automatic transmission.

7. An integrally controlling device as set forth in claim 2, wherein said supercharging means includes means for introducing the boost pressure automatically in association with a parameter selected from the group consisting of an intake air temperature of said engine, oil temperature of said engine, cooling water temperature of said engine, oil temperature of said automatic transmission, speed of depression of an accelerator of said vehicle, intake air quantity per turn of said engine, steering turning angle of said vehicle, shift frequency of said automatic transmission and select position of shift range of said automatic transmission.

8. An integrally controlling device as set forth in claim 3, wherein said supercharging means includes means for introducing the boost pressure automatically in association with a parameter selected from the group consisting of an intake air temperature of said engine, oil temperature of said engine, cooling water temperature of said engine, oil temperature of said automatic transmission, speed of depression of an accelerator of said vehicle, intake air quantity per turn of said engine, steering turning angle of said vehicle, shift frequency of said automatic transmission and select position of shift range of said automatic transmission.

9. An integrally controlling device as set forth in claim 4, wherein said supercharging means includes means for introducing the boost pressure automatically in association with a parameter selected from the group consisting of an intake air temperature of said engine, oil temperature of said engine, cooling water temperature of said engine, oil temperature of said automatic transmission, speed of depression of an accelerator of said vehicle, intake air quantity per turn of said engine, steering turning angle of said vehicle, shift frequency of said automatic transmission and select position of shift range of said automatic transmission.

10. An integrally controlling device as set forth in claim 5, wherein said supercharging means includes means for introducing the boost pressure automatically in association with a parameter selected from the group consisting of an intake air temperature of said engine, oil temperature of said engine, cooling water temperature of said engine, oil temperature of said automatic transmission, speed of depression of an accelerator of said vehicle, intake air quantity per turn of said engine, steering turning angle of said vehicle, shift frequency of said automatic transmission and select position of shift range of said automatic transmission and select position of shift range of said automatic transmission.

11. An integrally controlling device as set forth in claim 1, wherein said supercharging means is a mechanical driving type supercharger, and said oil pressure in said hydraulic control device is increased or decreased in aociation with an ON-OFF signal of a clutch for selectively driving said supercharger.

12. An integrally controlling device as set forth in claim 2, wherein said supercharging means is a mechanical driving type supercharger, and said line pressure in said hydraulic control device is increased or decreased in association with an ON-OFF signal of a clutch for selectively driving said supercharger.

13. An integrally controlling device as set forth in claim 3, wherein said supercharging means is a mechanical driving type supercharger, and said transitional oil pressure is increased or decreased in association with an ON-OFF signal of a clutch for selectively driving said supercharger.

14. An integrally controlling device as set forth in claim 4, wherein said supercharging means is a mechanical driving type supercharger, and said back pressure of the accumulator is increased or decreased in association with an ON-OFF signal of a clutch for selectively driving said supercharger.

15. An integrally controlling device as set forth in claim 5, wherein said supercharger means is a mechanical driving type supercharger, and said line pressure and said transitional oil pressure are increased or decreased in association with an ON-OFF signal of a clutch for selectively driving said supercharger.

* * * * *